TABLE 1-continued

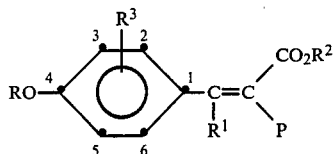

| Example No. | R | R¹ | R² | R³ | P |
|---|---|---|---|---|---|
| 46 | CH₂CH₂—N(C(=O)—NH)(C(=O)—CH₂)(CH₃) | H | CH₃ | H | CON(CH₃)C₆H₅ |
| 47 | CH₂CH₂N(C(=O))(SO₂)-benzo | H | CH₃ | H | CN |
| 48 | CH₂CH₂N(C(=O)—S)(C(=O)—CH₂) | H | CH₃ | H | CN |
| 49 | CH₂CH₂N(C(=O)—CH₂)(O)(C(=O)—CH₂) | H | CH₃ | H | CN |
| 50 | CH₂CH₂CH₂NHCOC₂H₅ | H | CH₃ | H | CN |
| 51 | H | H | CH₃ | 3,5-di-OCH₃ | CN |
| 52 | CH₃ | H | CH₃ | 3,5-di-OCH₃ | CN |

Typical polyesters prepared in accordance with this invention are given in the examples below.

The inherent viscosities (I.V.) of each of the copolyesters herein are determined according to ASTM D2857-70 procedure in a Wagner Viscometer of Lab Glass Inc. of Vineland, N.J. having a ½ ml. capillary bulb, using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation $$(\eta)_{0.50\%}^{25° C.} = \frac{\ln \frac{t_s}{t_o}}{C}$$

where:
($\eta$)=Inherent viscosity at 25° C. at a polymer concentration of 0.5 g./100 ml. of solvent;
ln=Natural logarithm;
$t_s$=Sample flow time;
$t_o$=Solvent-blank flow time; and
C=Concentration of polymer in grams per 100 ml. of solvent=0.50.

EXAMPLE 53

A typical synthesis of poly(ethylene terephthalate) reacted with a methine compound is as follows. A total of 97 g (0.5 mol) dimethyl terephthalate, 62 g (1.0 mol) ethylene glycol, 0.0192 g (200 ppm) of the compound

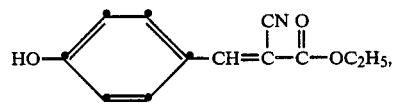

and 0.29 ml of a n-butanol solution of acetyl triisopropyl titanate which contains 0.03 g titanium per ml are weighed into a 500-ml, single-necked, round-bottom flask equipped with a nitrogen inlet, stirrer, vacuum outlet, and condensing flask. The flask and contents are

salt (94% of theory). 5 g of this salt are sealed under nitrogen in a bomb tube, and heated in a salt bath at 270° C. for 2 hours, in the course of which there is formed a clear melt which, on cooling, solidifies to form an opaque substance. The precondensate is removed from the bomb tube, and is subsequently heated in a condensing tube, as nitrogen is being passed through, at 280° C. for 5 hours. On cooling, the melt crystallises into the form of an opaque material.

The reduced solution viscosity, measured on a 0.5% solution in m-cresol at 25° C., is 0.45 dl/g.

In the DSC, the polyamide shows a melting peak having a maximum at 239° C.

EXAMPLE 2

In a polycondensation apparatus, through which nitrogen is being passed, a mixture of 1.9859 g of naphthalene-1,4-dicarboxylic acid diphenyl ester and 1.5337 g of 4,13-diamino-3,14-dimethylhexadecane is heated, in the course of one hour, from 220° to 280° C. There is then applied a vacuum of about 0.1 mbar, and the temperature is held for a further hour at 280° C. in order to hasten the polycondensation and to completely distil off the phenol being released in the process. On cooling, the melt crystallises to form an opaque substance;
melting point (DSC): 243° C.;
reduced solution viscosity: 0.39 dl/g.

EXAMPLE 3

By a procedure analogous to that of Example 2, a mixture of 1.7495 g of naphthalene-1,4-dicarboxylic acid diphenyl ester and 1.6114 g of 1,10-diamino-1,10-dicyclohexyldecane is polycondensed to a polyamide;
melting point (DSC): 251° C.;
reduced solution viscosity: 0.55 dl/g.

EXAMPLE 4

In a manner corresponding to that of Example 2, 2.02 g of 4.13-diamino-3,14-diethylhexadecane are polycondensed with 2.37 g of naphthalene-1,4-dicarboxylic acid diphenyl ester to a polyamide;
melting point (DSC): 258° C.;
reduced solution viscosity: 0.44 dl/g.

What is claimed is:

1. A polyamide, formed from at least one dicarboxylic acid and diamine, having a reduced solution viscosity of at least 0.3 dl/g, measured on a 0.5% solution in m-cresol at 25° C., and having 100 mol %, relative to the polyamide, of recurring structural elements of formula I

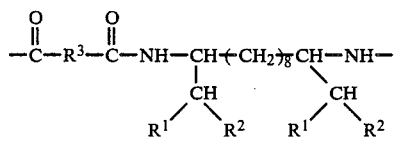

wherein $R^1$ is alkyl having 1 to 4 C atoms, and $R^2$ is alkyl having 1 to 8 C atoms, or $R^1$ and $R^2$ together are tri-, tetra- or pentamethylene, $R^3$ is a radical of the formulae

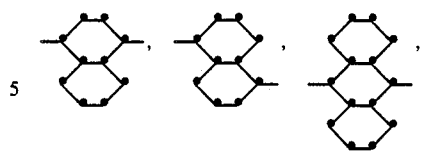

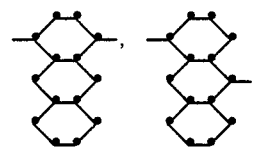

the six-membered rings being aliphatic or aromatic hydrocarbon radicals.

2. A polyamide according to claim 1, wherein $R^1$ and $R^2$ are methyl or ethyl, or $R^1$ and $R^2$ together are tetra- or pentamethylene.

3. A polyamide according to claim 1, wherein $R^3$ is a radical of the formula

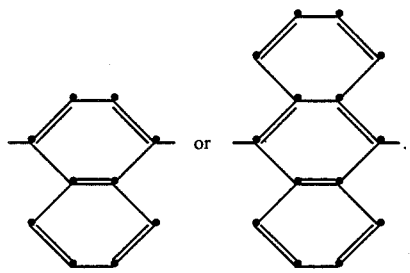

4. A polyamide according to claim 1, which consists of structural elements of the formula

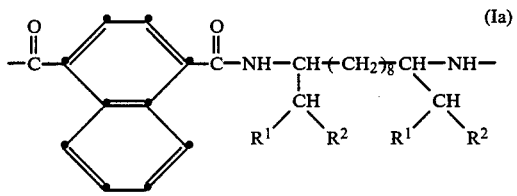

wherein $R^1$ is methyl and $R^2$ is methyl or ethyl, or $R^1$ and $R^2$ together are tri- or tetramethylene.

5. A polyamide according to claim 1 which consists of structural elements of formula

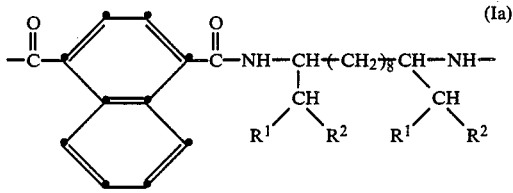

wherein $R^1$ and $R^2$ together are pentamethylene.

6. A molded article, fiber or filament of the polyamide according to claim 1.